United States Patent
Wang et al.

(10) Patent No.: US 11,132,453 B2
(45) Date of Patent: Sep. 28, 2021

(54) DATA-DRIVEN PRIVACY-PRESERVING COMMUNICATION

(71) Applicant: Mitsubishi Electric Research Laboratories, Inc., Cambridge, MA (US)

(72) Inventors: Ye Wang, Andover, MA (US); Prakash Ishwar, Brookline, MA (US); Ardhendu Tripathy, Ames, IA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 550 days.

(21) Appl. No.: 15/845,917

(22) Filed: Dec. 18, 2017

(65) Prior Publication Data
US 2019/0188402 A1   Jun. 20, 2019

(51) Int. Cl.
| | |
|---|---|
| *G06F 7/04* | (2006.01) |
| *G06F 21/62* | (2013.01) |
| *G06N 3/08* | (2006.01) |
| *G06N 3/04* | (2006.01) |
| *G06N 7/00* | (2006.01) |

(Continued)

(52) U.S. Cl.
CPC ...... *G06F 21/6218* (2013.01); *G06F 21/6254* (2013.01); *G06N 3/0454* (2013.01);
(Continued)

(58) Field of Classification Search
CPC . G06F 21/6218; G06F 21/6245; G06N 7/005; G06N 3/08
See application file for complete search history.

(56) References Cited

U.S. PATENT DOCUMENTS

| | | | |
|---|---|---|---|
| 7,353,184 B2 | 4/2008 | Kirshenbaum et al. | |
| 2010/0312745 A1* | 12/2010 | Tabak | G06F 17/18 706/52 |

(Continued)

FOREIGN PATENT DOCUMENTS

WO   2015026384 A1   11/2013

OTHER PUBLICATIONS

Huang et al., "Context-Aware Generative Adversarial Privacy." Dec. 3, 2017. arXiv:1710.09549.
(Continued)

*Primary Examiner* — Fatoumata Traore
*Assistant Examiner* — Carlton Johnson
(74) *Attorney, Agent, or Firm* — Gennadiy Vinokur; Hironori Tsukamoto

(57) ABSTRACT

A communication system including a receiver to receive training data. An input interface to receive input data coupled to a hardware processor and a memory. The hardware processor is configured to initialize the privacy module using the training data. Generate a trained privacy module, by iteratively optimizing an objective function. Wherein for each iteration the objective function is computed by a combination of a distortion of the useful attributes in the transformed data and of a mutual information between the sensitive attributes and the transformed data. Such that the mutual information is estimated by the auxiliary module that maximizes a conditional likelihood of the sensitive attributes given the transformed data. Receive the input data via the input interface. Apply the trained privacy module on the input data to produce an application specific transformed data. A transmitter to transmit the application specific transformed data over a communication channel.

21 Claims, 11 Drawing Sheets

(51) Int. Cl.
G06Q 30/02 (2012.01)
H04L 29/06 (2006.01)
(52) U.S. Cl.
CPC ............... *G06N 3/08* (2013.01); *G06N 7/005* (2013.01); *G06F 21/6245* (2013.01); *G06Q 30/02* (2013.01); *H04L 63/0407* (2013.01)

(56) References Cited

U.S. PATENT DOCUMENTS

| | | | |
|---|---|---|---|
| 2012/0195377 A1* | 8/2012 | Auyeung | H04N 19/122 375/240.12 |
| 2015/0235051 A1 | 8/2015 | Fawaz et al. | |
| 2015/0269391 A1 | 9/2015 | Ukil | |
| 2015/0379275 A1 | 12/2015 | Fawaz et al. | |
| 2016/0300252 A1 | 10/2016 | Frank et al. | |

OTHER PUBLICATIONS

Wang et al., "Privacy-Utility Tradeoffs under Constrained Data Release Mechanisms." Information Theory (cs.IT); Cryptography and Security (cs.CR). Oct. 25, 2017. arXiv:1710.09295.

Jihun Hamm, "Minimax Filter: Learning to Preserve Privacy from Inference Attacks." Journal of Machine Learning Research 18 (2017) 1-31. Dec. 1, 2017. arXiv:1610.03577.

Edwards et al., "Censoring Representations With an Adversary." Published as a conference paper at ICLR 2016. arXiv:1511.05897v3 [cs.LG] Mar. 4, 2016.

Goodfellow et al., "Generative Adversarial Nets." arXiv:1406.2661v1 [stat.ML] Jun. 10, 2014.

Calmon et al., "Privacy Against Statistical Inference." Information Theory (cs.IT); Cryptography and Security (cs.CR). arXiv:1210.2123.

B.V. Harita., "Preserving the Privacy and Sharing the Data Using Classification on Perturbed Data." International Journal of Engineering Science and Technology (IJEST). vol. 3 No. 12 Dec. 2011. pp. 8334-8341.

Rebollo Monedero et al. "From T Closeness Like Privacy to Postrandomization via Information Theory," IEEE Transactions on Knowledge and Data Engineering, IEEE Service Centerm Los Alamitos, CA, US. vol. 22, No. 11. Oct. 16, 2009. pp. 1623-1636.

Makhdoumi et al., "From the Information Bottleneck to the Privacy Funnel," 2014 IEEE Information Theory Workshop, IEEE Nov. 2, 2014. pp. 501-505.

\* cited by examiner

DATA-DRIVEN PRIVACY-PRESERVING COMMUNICATION

FIELD

The present disclosure relates to methods and systems for removing portions of user sensitive information from an aggregate data stream, and more particularly, to privacy protection of the user aggregated data before transmitting to a third party, while preserving the analytical usefulness of the aggregated data.

BACKGROUND

For many consumers, the collection of user data raises privacy concerns because such data is particularly associated with information that a user may deem sensitive and wants to keep private. The problem for consumers is that consumer service providers have access to their private information including personal behavior and lifestyle (such as, appliance use, eating and sleeping patterns, occupancy patterns, household activity patterns), health status, household make-up, mobility patterns and the like. The collection of data by the consumer service provider can happen without the user's consent or potentially without a possibility for the user to opt-out. The consumer service provider collecting the user's data is likely to make this data available to third parties, either without the user's knowledge and/or without the user knowing the extent of the collected data in terms of their personal privacy. Typically, consumers trust their consumer service provider collecting the data, but do not trust the third-party with whom the consumer service provider may share the consumer's collected data.

Specifically, this problem of protecting consumer/user privacy data goes to the control over service providers and third-party's access to their personal data. In particular, releasing personal information which is considered private to the consumer.

Some conventional solutions for protecting consumer's personal data, include modifying the consumer's privacy data prior to releasing the consumer's data to third party. Such methods are usually referred as data anonymization methods aiming for protecting the consumer's privacy data while preserving an analytical usefulness of the data.

Some methods use model based approaches to address the abovementioned sensing problem. The privacy-preserving data release problem is mathematically modeled using models relating sensitive data being preserved, useful data being released, and observation data indicative of the sensitive data and the useful data. However, the models are difficult to design and various approaches use simplifications that limit applications of their solutions. For example, a method disclosed in US 2015/0235051 only applies to the special case where the observation W is simply the useful data Y. Further, this method requires the data/observation models to be known and does not address the computational feasibility for high-dimensional and/or continuous alphabets.

Accordingly, there is a need for a data anonymization method that can minimize or avoid the usage of the models of the underlying data.

SUMMARY

According to embodiments of the present disclosure to provide a system and a method for removing portions of user sensitive information from an aggregate data stream, to privacy protect the user aggregated data before transmitting to a third party, while preserving the analytical usefulness of the aggregated data.

The privacy-preserving data release problem can be thought as a tradeoff problem between two competing objectives of minimizing the distortion of the useful data (to preserve utility, i.e. analytical usefulness) and minimizing the leakage of sensitive information (to preserve privacy). Aspects of some embodiments can be to disclose a system and a method that solves the privacy-utility tradeoff problem to obtain a theoretically optimal tradeoff between privacy and utility.

Some embodiments are based on recognition that the privacy-utility tradeoff problem can be formulated as a minimization of an objective function indicative of the privacy-utility tradeoff in the data being released, e.g., to a third party. In some embodiments, the observations, e.g., measurements, on the data are transformed to preserve both privacy and utility of the data. To that end, the released data is referred herein as transformed data or released data.

For example, the objective function can include a combination a distortion of the useful data and presence of the sensitive data in the transformed data. For example, the distortion of the useful data can be measured by an expected distortion function of the useful and transformed data. The expected distortion function can vary for different applications. For example, the presence of the sensitive data can be measured as a mutual information of the transformed data and the sensitive data.

Some embodiments are based on recognition that achieving the theoretically optimal tradeoff between the privacy and utility objectives inherently requires randomized release data. Thus, the system that generates the transformed data should be randomized in order to achieve theoretically optimal tradeoffs. Conventional deterministic systems and other conventional systems that employ randomization in only a limited manner are generally unable to achieve all of the theoretically optimal tradeoffs.

Some embodiments are based on understanding that if the data and observation models are unknown, it is possible to estimate probability distributions of sensitive, useful and observed data from available training samples, and then optimize the objective function with respect to those probabilistic distributions. However, accurate estimation of the probabilistic distributions over continuous and/or high-dimensional alphabets can be challenging. Even with known (or reasonably accurate) data and observation models, this optimization approach may become impractical for complex distributions over continuous and/or high-dimensional alphabets.

To that end, some embodiments address the privacy-utility tradeoff problem for situations when the data/observation models are unknown. For example, some embodiments train a parametric function, e.g., a neural network, to transform the incoming input data to obtain a theoretically optimal tradeoff between privacy and utility in the transformed data.

Some embodiments are based on the understanding that mutual information is difficult to estimate for use in an optimization objective when knowledge of the data model is not available. However, some embodiments are based on the recognition that estimating mutual information can be achieved using an additional neural network trained concurrently with the main neural network but having a different, i.e., competitive, objective. For example, while the main neural network is trained to minimize the objective function, that additional network is trained to maximize the objective function. Such an additional network is referred herein as adversarial neural network due to it adversarial goal in comparison with main neural network.

Some embodiments are based on realization that a parametric function for transforming input data to address the privacy-utility tradeoff problem can be trained to minimize an objective function including a component for mutual information of the sensitive and transformed data and a component for a distortion of the useful information in the transformed data, while another adversarial parametric function can be trained to maximize at least one component of the objective function to estimate the mutual information of the sensitive and transformed data. The concurrent training, evaluation and update of these parametric functions can provide the desired balancing of the components of the objective function.

Some embodiments are based on realization that to achieve the theoretically optimal tradeoff between privacy and utility in the transformed data, the optimization of the parametric function needs to be performed with adversarial training, which can be interpreted as a variational Bayesian method. For example, one embodiment adds at least the following modifications. First, the main parametric function is trained to produce a randomized variable defined by a parametric family of distributions. In such a manner, the parametric function is configured to transform the input data into transformed data selected according to a probability distribution conditioned on values of the input data. Second, the component of the objective function to be maximized by the adversarial parametric function is selected to be the mutual information component, and the adversarial parametric function is trained to maximize a conditional likelihood of the sensitive data given the transformed data.

There are two alternative embodiments to realize the randomized parametric function:
1. Parametric distribution: the output of the parametric function is a set of parameters that specific the conditional distribution $P_{Z|W}$ within a chosen parametric family of distributions. In this embodiment, the conditional distribution $P_{Z|W}$ is directly available as a function of the observation W, and is then randomly sampled from, to produce the released data Z. Note that the parameters that specify the parametric function are those that control the parametric function that produces, as a function of W, the parameters that specify the conditional distribution $P_{Z|w}$.
2. Seed noise randomization: random seed noise is used an additional input to the parametric function to randomize the output as a function of the observation W. In this embodiment, the output of the parametric function is the randomized released data Z. The conditional distribution $P_{Z|W}$ is not directly available, but instead realized as the randomized behavior in this embodiment of the parametric function.

Some embodiments are based on a realization allowing the mutual information term I(X;Z) in the optimization problem to be efficiently approximated, while avoiding the potential intractability of analytical evaluation and the need for model knowledge. Since mutual information I(X;Z)=H(X)−H(X|Z) and H(X) is constant with respect to the mechanism, I(X;Z) can be replaced with the negative conditional entropy −H(X|Z) in the optimization objective. Further, we have that $-H(X|Z) = \max_Q E[\log Q(X|Z)]$, where, the maximization is, in principle, over all conditional distributions Q for X given Z. Theoretically, the maximum is obtained by Q equal to the true posterior distribution $P_{X|Z}$ with respect to the mechanism (distribution $P_{Z|W}$) and the data and observation models (distributions $P_{X,Y}$ and $P_{W|X,Y}$). In practice, since it may be intractable to determine the true posterior $P_{X|Z}$ or optimize over all conditional distributions Q, the maximization may be approximated over a parametric family of distributions, which would result in the optimization providing a lower-bound on −H(X|Z). The adversarial network provides this parametric approximation of the conditional distribution Q, by taking as input the released data Z and producing a conditional distribution for the sensitive data X given the release data Z. The optimization of the adversarial involves optimizing this parametric approximation to maximize the conditional likelihoods of the sensitive data samples given the release data samples.

Some embodiments reserve privacy while maintaining utility of data by developing a mapping from observed data to transformed data using an optimization that considers the mutual information between the sensitive and released data (privacy) and the expected distortion between the useful data and released data (utility). Specifically, the training data can include three components: observed data, useful data and sensitive data. Theses embodiments provide for a specific mapping function having particular properties, that surprisingly result in unique privacy aspects for the user using the systems.

According to an embodiment of the present disclosure, a communication system including a receiver to receive training data from at least one sensor. Wherein the training data includes samples of data having predetermined sensitive attributes, useful attributes and observable data. An input interface to receive input data. A hardware processor coupled to the receiver and a memory, capable of executing a privacy module, an auxiliary module, a plurality of functions and the training data stored in the memory. The hardware processor is configured to initialize the privacy module using the training data. Wherein the privacy module is configured to transform the training data into transformed data by determining parameters of a parametric probability distribution. Generate a trained privacy module, by iteratively optimizing an objective function. Wherein for each iteration the objective function is computed by a combination of a distortion of the useful attributes in the transformed data and of a mutual information between the sensitive attributes and the transformed data. Such that the mutual information is estimated by the auxiliary module that maximizes a conditional likelihood of the sensitive attributes given the transformed data. Receive the input data via the input interface in communication with the hardware processor. Apply the trained privacy module on the input data to produce an application specific transformed data. A transmitter to transmit the application specific transformed data over a communication channel.

According to another embodiment of the present disclosure, communication system including a receiver to receive training data from at least one sensor. Wherein the training data includes samples of data having predetermined sensitive attributes, useful attributes and observable data. An input interface to receive input data. A hardware processor coupled to the receiver and a memory, is capable of executing a privacy module, an auxiliary module, a plurality of functions and the training data stored in the memory, and in an offline state. The hardware processor is configured to initialize the privacy module using the training data. Wherein the privacy module is configured to transform the training data into transformed data by determining parameters of a parametric probability distribution. Such that the transformed data is produced by randomly sampling according to the parametric probability distribution. Generate a trained privacy module, by iteratively optimizing an objective function. Wherein for each iteration the objective function is computed by a combination of a distortion of the useful attributes in the transformed data and of a mutual information between the sensitive attributes and the transformed data. Such that the mutual information is estimated by the auxiliary module that maximizes a conditional likelihood of the sensitive attributes given the transformed data. Wherein the iterations continue until a termination condition is met, to obtain the trained privacy module. Receive the input data via the input interface in communication with the hardware processor in an online state. Apply the trained privacy module on the input data to produce an application specific transformed data. A transmitter to transmit the application specific transformed data over a communication channel.

According to another embodiment of the present disclosure, a method for applying a privacy module to transform data, such that a privacy of the transformed data is protected, while analytical usefulness of the transformed data is preserved. The method including receiving training data via a receiver from at least one sensor. Wherein the training data includes training data samples including predetermined sensitive attributes, useful attributes and observable data. Storing a privacy module, an auxiliary module a plurality of functions and the training data in a memory. Wherein the privacy module is configured to transform the training data into transformed data by determining parameters of a parametric probability distribution. Such that the transformed data is produced by randomly sampling according to the parametric probability distribution. Wherein the memory is in communication with the receiver. Using a hardware processor coupled to the receiver and the memory, capable of executing the stored privacy module and the stored plurality of functions. The hardware processor is configured for initializing the stored privacy module using the training data. Wherein the privacy module is configured to transform the training data into transformed data by determining parameters of a parametric probability distribution. Such that the transformed data is produced by randomly sampling according to the parametric probability distribution. Generating a trained privacy module, by iteratively optimizing an objective function. Wherein for each iteration the objective function is computed by a combination of a distortion of the useful attributes in the transformed data and of a mutual information between the sensitive attributes and the transformed data. Such that the mutual information is estimated by the auxiliary module that maximizes a conditional likelihood of the sensitive attributes given the transformed data, wherein the iterations continue until a termination condition is met, to obtain the trained privacy module. Receiving input data via an input interface in communication with the hardware processor in an online state. Applying the trained privacy module on the input data to produce an application specific transformed data. Transmitting via a transmitter the application specific transformed data over a communication channel.

Further features and advantages will become more readily apparent from the following detailed description when taken in conjunction with the accompanying drawings.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

Figure 1A:
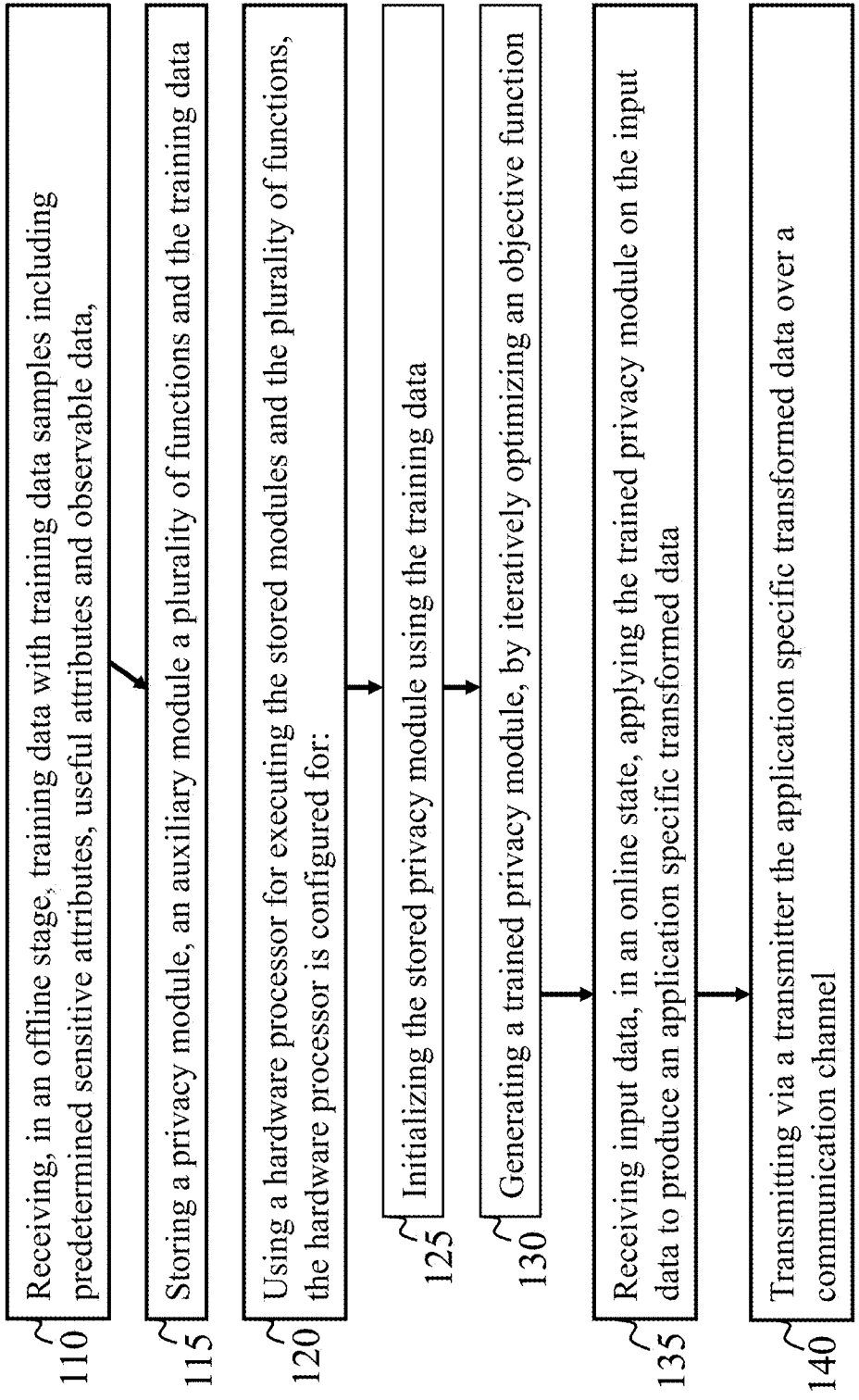
FIG. 1A is a block diagram of a method for applying a privacy module to transform data, such that a privacy of the transformed data is protected, while analytical usefulness of the transformed data is preserved, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

Embodiments of the present disclosure provide systems and methods for removing portions of user sensitive information from an aggregate data stream, to privacy protect the user aggregated data before transmitting to a third party, while preserving the analytical usefulness of the aggregated data.

The privacy-preserving data release problem can be thought as a tradeoff problem between two competing objectives of minimizing the distortion of the useful attributes (to preserve utility, i.e. analytical usefulness) and minimizing the leakage of sensitive attributes (to preserve privacy). The leakage of sensitive attributes is measured by the mutual information of the sensitive attributes in the released data, i.e. transformed data.

At least one recognition of the present disclosure is that there needs to be a minimization of an objective function indicative of the privacy-utility tradeoff in the data being released, e.g., to a third party, in order to produce a data release mechanism that performs at or near the optimal privacy-utility tradeoffs. Wherein observations, e.g., measurements, on the data are transformed to preserve both privacy and utility of the data. To that end, the released data, i.e. transformed data is referred herein as transformed data or released data. For example, the objective function can include a combination a distortion of the useful data and presence of the sensitive data in the released data. The distortion of the useful data can be measured by an expected distortion function of the useful and released data. The expected distortion function can vary for different applications. For example, with discrete, categorical data, probability of error may be an appropriate distortion measure for some applications. For another example, with some applications involving continuous data, expected mean-squared-error may be an appropriate distortion measure. For yet another example, with some applications involving multivariate data, wherein the presence of the sensitive data can be inversely measured as a mutual information of the transformed data and the sensitive data.

Some embodiments are based on recognition that achieving the theoretically optimal tradeoff between the privacy and utility objectives inherently requires randomized release data. Thus, the system that generates the transformed data should be randomized in order to achieve theoretically optimal tradeoffs. Conventional deterministic systems and other conventional systems that employ randomization in only a limited manner are generally unable to achieve all of the theoretically optimal tradeoffs.

Some embodiments address the privacy-utility tradeoff problem for situations when the data/observation models are unknown. For example, some embodiments train a parametric function, e.g., a neural network, to transform the incoming input data to obtain a theoretically optimal tradeoff between privacy and utility in the transformed data.

Some embodiments are based on the understanding that mutual information is difficult to estimate for use in an optimization objective when knowledge of the data model is not available, since mutual information is statistical measure that depends on the model distribution. However, some embodiments are based on the recognition that estimating mutual information can be achieved using an additional neural network trained concurrently with the main neural network but having a different, i.e., competitive, objective. For example, while the main neural network is trained to minimize the objective function, that additional network is trained to maximize the objective function. Such an additional network is referred herein as adversarial neural network due to it adversarial goal in comparison with main neural network. This "adversarial neural network" is the same as the auxiliary function mentioned in other parts of this. We are using it to enable an approximation of mutual information (see below), which is otherwise hard to estimate (see below). Prior has also used an adversarial neural network in a privacy framework, however, none of them did so in a way to address approximating mutual information for general sensitive data variables that may be discrete, continuous, and/or multivariate (i.e., prior art was limited to only binary or discrete sensitive data, and most approaches did not even attempt to address mutual information privacy).

Above discloses some features relevant to the present disclosure that overcome conventional approaches, by non-limiting example, some aspects of the present disclosure include: (1) not requiring data/observation models to be known or assumed; (2) addresses privacy by measuring mutual information; (3) optimizes randomized mechanisms that can approach the optimal privacy-utility tradeoffs; (4) the present disclosure is able to handle general sensitive data variables that can be discrete, continuous, and/or multivariate (i.e., in particular, not limited to only binary or discrete sensitive data, which is in contrast to conventional approaches).

Some embodiments are based on realization that the parametric function for transforming input data to address the privacy-utility tradeoff problem can be trained to minimize an objective function including a component for mutual information in the sensitive and transformed data and a component for a distortion of the useful information in the transformed data, while another adversarial parametric function can be trained to maximize at least one component of the objective function. The concurrent training, evaluation and update of these parametric functions can provide the desired balancing of the components of the objective function.

Some embodiments are based on realization that to achieve the theoretically optimal tradeoff between privacy and utility in the transformed data, the optimization of the parametric function needs to be performed with adversarial training, which can be interpreted as a variational Bayesian method. For example, one embodiment adds at least the following modifications. First, the main parametric function is trained to produce a randomized variable defined by a parametric family of distributions. In such a manner, the parametric function is configured to transform the input data into transformed data selected according to a probability distribution conditioned on values of the input data. Second, the component of the objective function to be maximized by the adversarial parametric function is selected to be the mutual information component, and the adversarial parametric function is trained to maximize a conditional likelihood of the sensitive data given the transformed data.

There are at least two alternative embodiments to realize the randomized parametric function, i.e. privacy module:
1. Parametric distribution: the output of the parametric function is a set of parameters that specific the conditional distribution $P_{Z|W}$ within a chosen parametric family of distributions. In this embodiment, the conditional distribution $P_{Z|W}$ is directly available as a function of the observation W, and is then randomly sampled from, to produce the released data Z. Note that the parameters that specify the parametric function are those that control the parametric function that produces, as a function of W, the parameters that specify the conditional distribution $P_{Z|W}$.
2. Seed noise randomization: random seed noise is used an additional input to the parametric function to randomize the output as a function of the observation W. In this embodiment, the output of the parametric function is the randomized released data Z. The conditional distribution $P_{Z|W}$ is not directly available, but instead realized as the randomized behavior in this embodiment of the parametric function, i.e. privacy module.

Some embodiments are based on a realization allowing the mutual information term I(X;Z) in the optimization problem to be efficiently approximated, while avoiding the potential intractability of analytical evaluation and the need for model knowledge. Since mutual information I(X;Z)=H(X)−H(X|Z) and H(X) is constant with respect to the mechanism, I(X;Z) can be replaced with the negative conditional entropy −H(X|Z) in the optimization objective. Further, we have that $-H(X|Z)=\max_Q E[\log Q(X|Z)]$, where, the maximization is, in principle, over all conditional distributions Q for X given Z. Theoretically, the maximum is obtained by Q equal to the true posterior distribution $P_{X|Z}$ with respect to the mechanism (distribution $P_{Z|W}$) and the data and observation models (distributions $P_{X,Y}$ and $P_{W|X,Y}$). In practice, since it may be intractable to determine the true posterior $P_{X|Z}$ or optimize over all conditional distributions Q, the maximization may be approximated over a parametric family of distributions, which would result in the optimization providing a lower-bound on −H(X|Z). The adversarial network provides this parametric approximation of the conditional distribution Q, by taking as input the released data Z and producing a conditional distribution for the sensitive data X given the release data Z. The optimization of the adversarial involves optimizes this parametric approximation to maximize the conditional likelihoods of the sensitive data samples given the release data samples.

An embodiment of the present disclosure includes a communication system including a receiver to receive training data from at least one sensor. Wherein the training data includes samples of data having predetermined sensitive attributes, useful attributes and observable data. An input interface to receive input data. A hardware processor coupled to the receiver and a memory, capable of executing a privacy module, an auxiliary module, a plurality of functions and the training data stored in the memory. The hardware processor is configured to initialize the privacy module using the training data. Wherein the privacy module is configured to transform the training data into transformed data by determining parameters of a parametric probability distribution. Generate a trained privacy module, by iteratively optimizing an objective function. Wherein for each iteration the objective function is computed by a combination of a distortion of the useful attributes in the transformed data and of a mutual information between the sensitive attributes and the transformed data. Such that the mutual information is estimated by the auxiliary module that maximizes a conditional likelihood of the sensitive attributes given the transformed data. Receive the input data via the input interface in communication with the hardware processor. Apply the trained privacy module on the input data to produce an application specific transformed data. A transmitter to transmit the application specific transformed data over a communication channel.

FIG. 1A is a block diagram of a method for applying a privacy module to transform data, such that a privacy of the transformed data is protected, while analytical usefulness of the transformed data is preserved, according to embodiments of the present disclosure.

Specifically, step 110 shows the receiving training data via a receiver from at least one sensor, wherein the training data includes training data samples including predetermined sensitive attributes, useful attributes and observable data. The predetermined sensitive attributes can be data, attributes, and/or characteristics that may be associated with the observable data, and determined by the user and/or application as personally sensitive. The useful attributes can be data, attributes, and/or characteristics that may be associated with the observable data, and determined by the user and/or application as useful to be shared or revealed. The observable data can include partial, full, and/or potentially noisy data measurements of the predetermined sensitive attributes and the useful attributes, or the predetermined sensitive attributes and the useful attributes.

The training data includes time series data, smart home data, speech data, factory automation data, medical data. It is possible the training data could be sourced from a specific client, user or entity, as an initial training phase used to calibrate the system, or could be obtained from other sources that have similar statistical properties (e.g., similar statistical properties to the input data).

An example of some time series data can include one or a combination of smart meter data from at least one smart meter device in communication the at least one sensor, temperature data or other sensor data. The collected time-series data can be from a client or user for a particular consumer service from a consumer service provider. For example, types of consumer service providers may include residential/entities, energy/power providers and phone/communication providers.

Other types of consumer service providers may include health related providers, i.e. health-monitoring devices, or a type of monitoring service provider that provides sensors in houses, offices, cars, handheld devices or the like. Users or clients of consumer service providers may be one or combination of individuals and entities. Further, the time series data can include usage of at least one power consumer by a user, wherein the at least one power consumer includes a structure, a part of a structure, an electronic device, a power consuming device or some combination thereof. Further, the multiple data segments of the aggregate data can refer to an ongoing and/or future power consumption event by a user having at least one power consumer. Noted, is the possibility of the aggregate data can originate from a user, and is user energy data collected using a metering device located on a consumer side of the metering device.

An example for speech data can include observed data that consists of voice measurements recorded by a microphone. The useful attributes associated with this observed data consists of the textual transcript of the words spoken, which could be useful for various voice-control or voice-input applications. The sensitive attributes could include, possibly depending on the user's preference, various personal characteristics that could be inferred from the audio of the voice recording, such as gender, age, ethnicity/accent, mood, location/other ambient surroundings, etc.

An example for factory automation could include observed data that includes various factory sensor measurements. Useful attributes could include machine operating conditions that could be inferred from analysis of the sensor measurements and hence useful for factory diagnostics/reporting applications. Sensitive attributes could include proprietary knowledge/process information that could also be inferred from the sensor measurements.

An example for medical data could include observed data that includes patient histories (symptoms, diagnoses, treatments, evaluations, outcomes, etc.), where useful attributes including statistical trends/analyses could be useful for medical research applications, and sensitive attributes could include any specific medical information that is directly linked to a particular patient.

Step 115 includes storing a privacy module, an auxiliary module a plurality of functions and the training data in a memory. It is contemplated there may be one or more memory devices depending upon the application. The stored privacy module is configured to transform the training data into transformed data by determining parameters of a parametric probability distribution, such that the transformed data is produced by randomly sampling according to the parametric probability distribution, which defines the probabilistic mapping performed by the privacy module. The stored privacy module can be pre-trained with historical training data having predetermined sensitive attributes, useful attributes and observable data. The historical training data can include data that is statistically similar to the input data, that is, a model learned from the training data set can be statistically representative of the model learned from the input data, as noted above. The aspect of pre-training the stored privacy module is understood as producing an initial privacy module that is relevant to application but can still be further tuned by later training with user-specific data.

Further, the privacy module can determine the parameters of the parametric probability distribution by applying a neural network to the observed data, such that the output of the neural network are parameters. The parameters can be means, variances, and/or various statistical parameters that describe the particular parametric probability distribution.

Further, the privacy module can also include an additional input that is random seed noise, such that the privacy module produces transformed data as a randomized function of the observed data The stored auxiliary module is configured to take as input the transformed data and output parameters of a parametric probability distribution that approximates the posterior distribution of the sensitive attribute given the transformed data. Specifically, the auxiliary module can be optimized by a gradient descent algorithm to maximize the conditional log likelihood of the sensitive attributes given the transformed data.

Further, the privacy module and auxiliary module can be realized as parametric functions including neural networks, such that a gradient of the objective function is computed with respect to the parameters of the privacy module and the auxiliary module, and that the privacy module and the auxiliary module are optimized via gradient descent algorithms.

Step 120 includes using a hardware processor for executing the stored modules and the plurality of functions. The hardware processor is coupled to the receiver and the memory, and can be in communication with other devices such as sensors for measuring data, a receiver for receiving data, and a transmitter for transmitting data. It is contemplated that more than one hardware processor can be used depending upon the requirements of the specific application.

Step 125 includes initializing the stored privacy module using the training data. The stored privacy module could be first randomly initialized or initialized as a pre-trained privacy if available.

Step 125 includes generating a trained privacy module, by iteratively optimizing an objective function, wherein for each iteration the objective function is computed by a combination of a distortion of the useful attributes in the transformed data and of a mutual information between the sensitive attributes and the transformed data, such that the mutual information is estimated by the auxiliary module that maximizes a conditional likelihood of the sensitive attributes given the transformed data, wherein the iterations continue until a termination condition is met, to obtain the trained privacy module. Wherein the iterations continue until a termination condition is met, to obtain the trained privacy module. The objective function can be given by $$\frac{1}{m}\sum_{i=1}^{m} \log Q(x_i | z_i) + \lambda d(y_i, z_i),$$

wherein m is the number of training samples, i indexes the training samples, $x_i$ is a sample of sensitive attributes, $y_i$ is a sample of useful attributes, $z_i$ is a sample of transformed data, $Q(x_i|z_i)$ is the conditional likelihood of a sample of sensitive attributes $x_i$ given the sample of transformed data $z_i$, $\lambda$ is a balance parameter controlling a privacy-utility tradeoff, and $d(y_i,z_i)$ is the distortion of the sample of useful attributes $y_i$ in the sample of transformed data $z_i$. Alternatively, to target a specific distortion threshold $\delta$, the objective function can be given by $$\frac{1}{m}\sum_{i=1}^{m} \log Q(x_i | z_i) + \lambda (\max(d(y_i, z_i) - \delta, 0))^2,$$

wherein m is the number of training samples, i indexes the training samples, $x_i$ is a sample of sensitive attributes, $y_i$ is a sample of useful attributes, $z_i$ is a sample of transformed data, $Q(x_i|z_i)$ is the conditional likelihood of a sample of sensitive attributes $x_i$ given the sample of transformed data $z_i$, $\delta$ is the distortion threshold, $\lambda$ is a penalty parameter controlling the penalization for exceeding the distortion threshold, and $d(y_i,z_i)$ is the distortion of the sample of useful attributes $y_i$ in the sampled of transformed data $z_i$.

The distortion of the useful attributes in the transformed data is determined by an empirical average of an application and/or user specified distortion function, over a batch of training data and corresponding transformed data produced by applying the privacy mechanism to the observable data.

The mutual information between the sensitive attributes and the transformed data is estimated by an empirical average of a log of conditional likelihoods of the sensitive data over a batch of training data, such that the log of conditional likelihoods of the sensitive data is from the auxiliary module Step 130 includes receiving input data, in an online state, applying the trained privacy module on the input data to produce an application specific transformed data, such that the transformed data is produced by randomly sampling according to the parametric probability distribution determined by the privacy module. The input data can include the observed data. The aspect of online state is to apply the trained privacy module on the input data to produce transformed data that can be released to another party to provide analytical utility while also preserving the privacy of sensitive information.

Step 135 includes transmitting the application specific transformed data over a communication channel to another party as specified by the particular application.

Figure 1B:
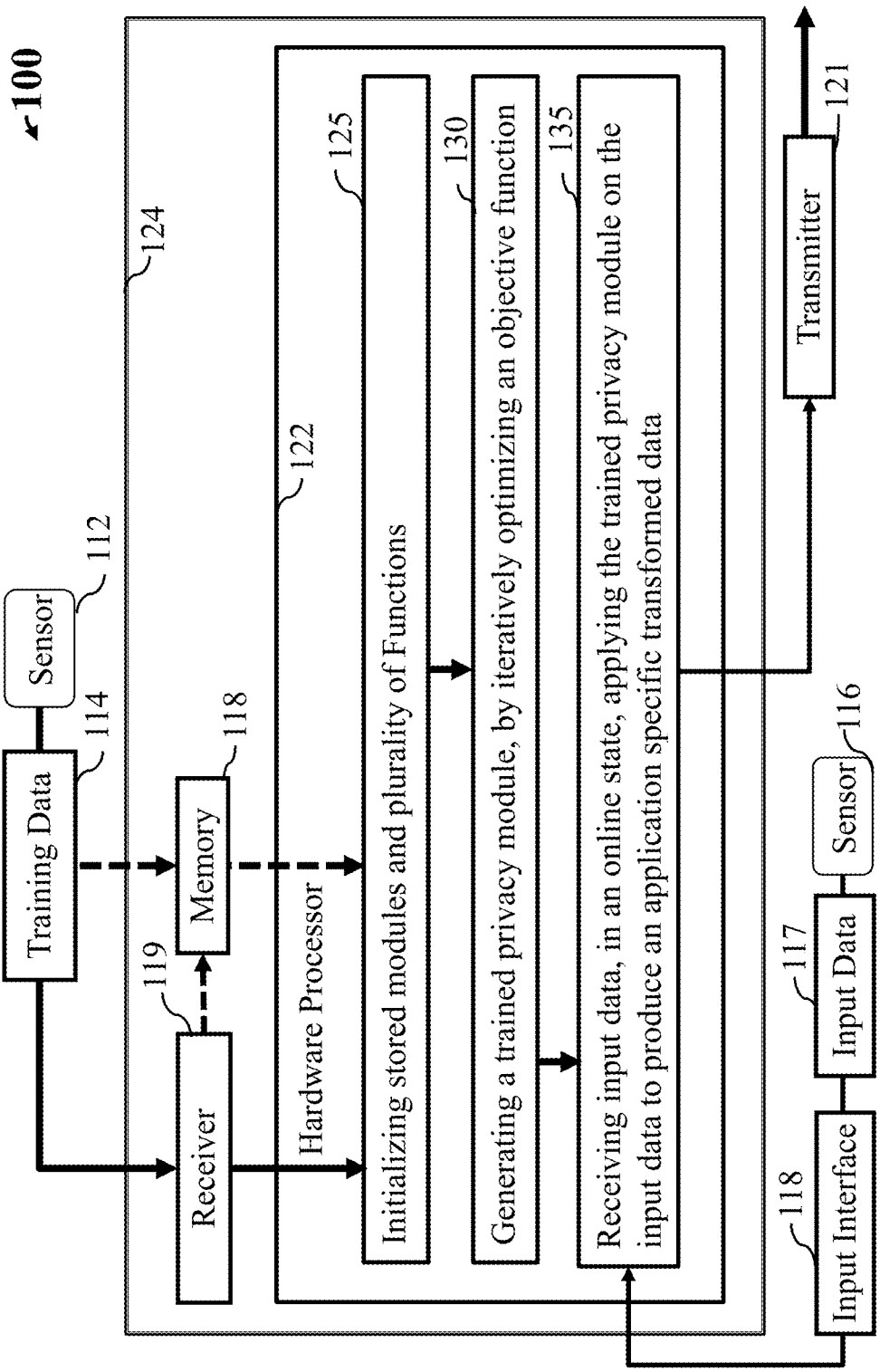
FIG. 1B is a block diagram illustrating the communication system of FIG. 1A, that further includes some components used for the communication system, according some embodiments of the present disclosure.

FIG. 1B is a block diagram illustrating the communication system of FIG. 1A, that further includes some components used for the communication system, according some embodiments of the present disclosure. The communication system 100 includes training data 114 that may be received wirelessly or wired to a sensor device 112, and in communication with the receiver 119. Wherein the training data 114 can be stored in a computer readable memory or memory 118. The training data 114 is stored in the memory 118 along with a plurality of modules and a plurality of functions. Further, a hardware processor 122 of a computer 124 can be used to process the communication system 100 steps. In the online stage, the hardware processor 122 receives the input data 117 from a sensor 116 or group of sensors via an input interface 118. Upon the hardware processor 122 applying the trained privacy module on the input data 117, the application specific transformed data is produced and transmitted via the transmitter 121 through a communication channel.

Figure 1C:
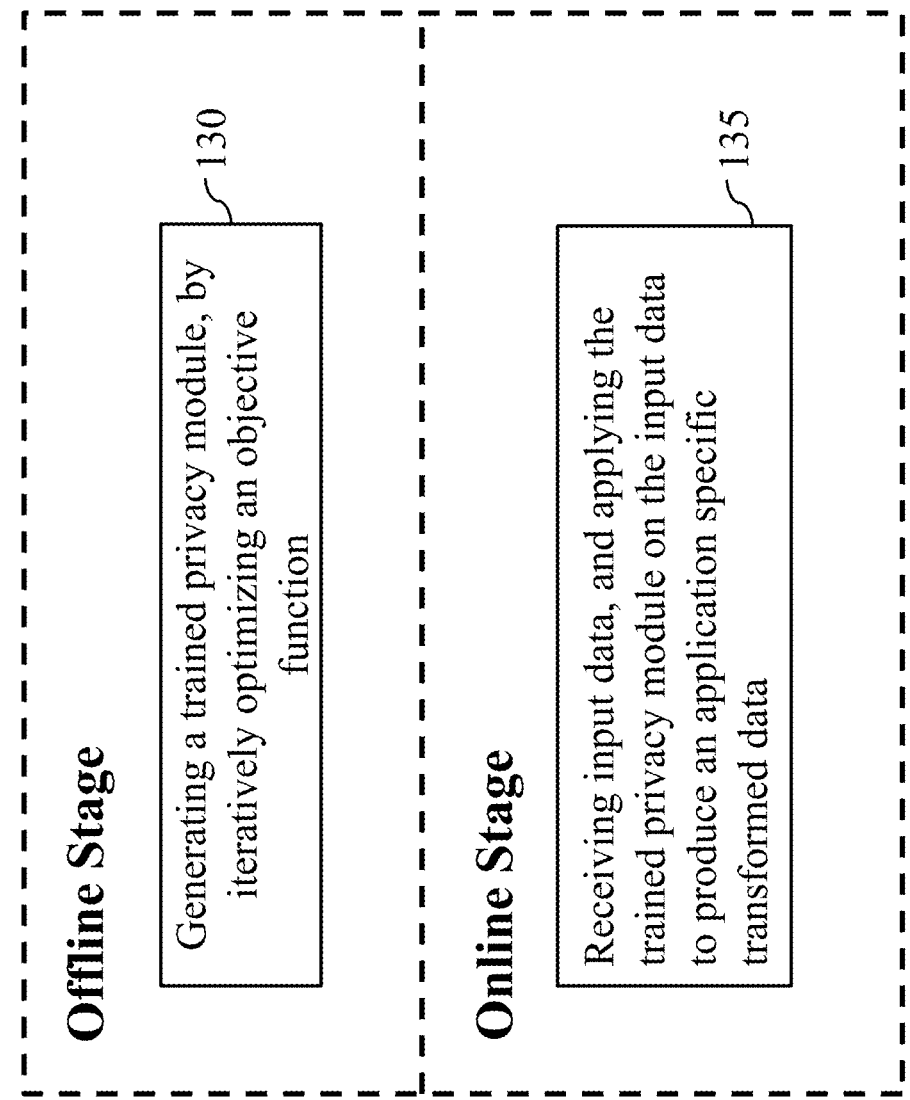
FIG. 1C is a block diagram illustrating the communication system of FIG. 1A, that shows the offline stage step 130 and also shows the online stage step 135, according some embodiments of the present disclosure.

FIG. 1C is a block diagram illustrating the communication system of FIG. 1A, that shows the offline stage step 130 regarding generating the trained privacy module, by iteratively optimizing an objective function. The offline stage includes the generation of a trained privacy module that optimized with respect to the privacy-utility tradeoff for the application/user-specific data.

FIG. 1C also shows the online stage step 135 regarding receiving input data, and applying the trained privacy module on the input data to produce an application specific transformed data. The aspect of online state is to apply the trained privacy module on the input data to produce transformed data that can be released to another party to provide analytical utility while also preserving the privacy of sensitive information.

Figure 1D:
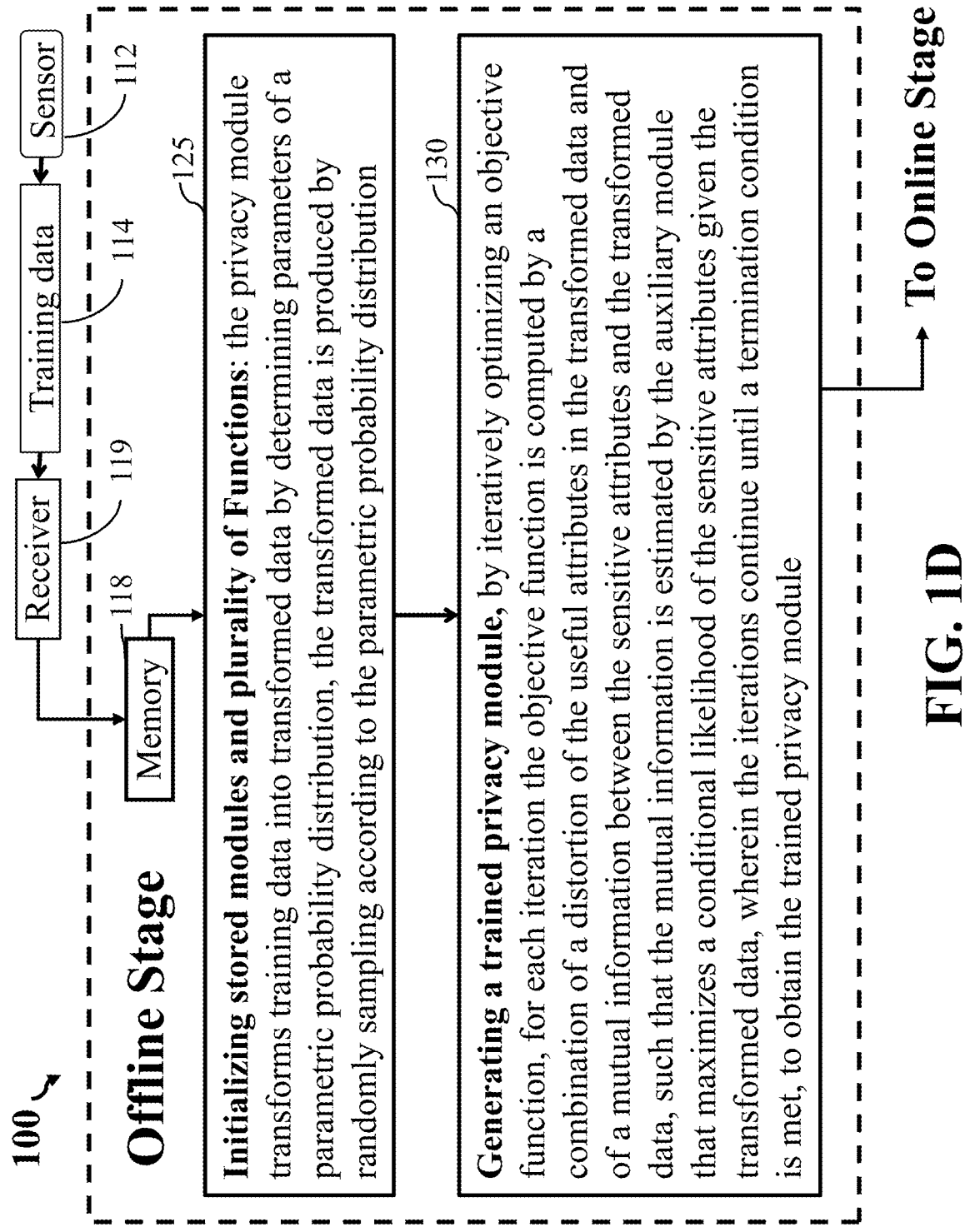
FIG. 1D is a block diagram illustrating the offline stage of FIG. 1C, according some embodiments of the present disclosure.

FIG. 1D is a block diagram illustrating the offline stage of FIG. 1C, according some embodiments of the present disclosure. The offline stage includes the generation of a trained privacy module that optimized with respect to the privacy-utility tradeoff for the application/user-specific data.

Figure 1E:
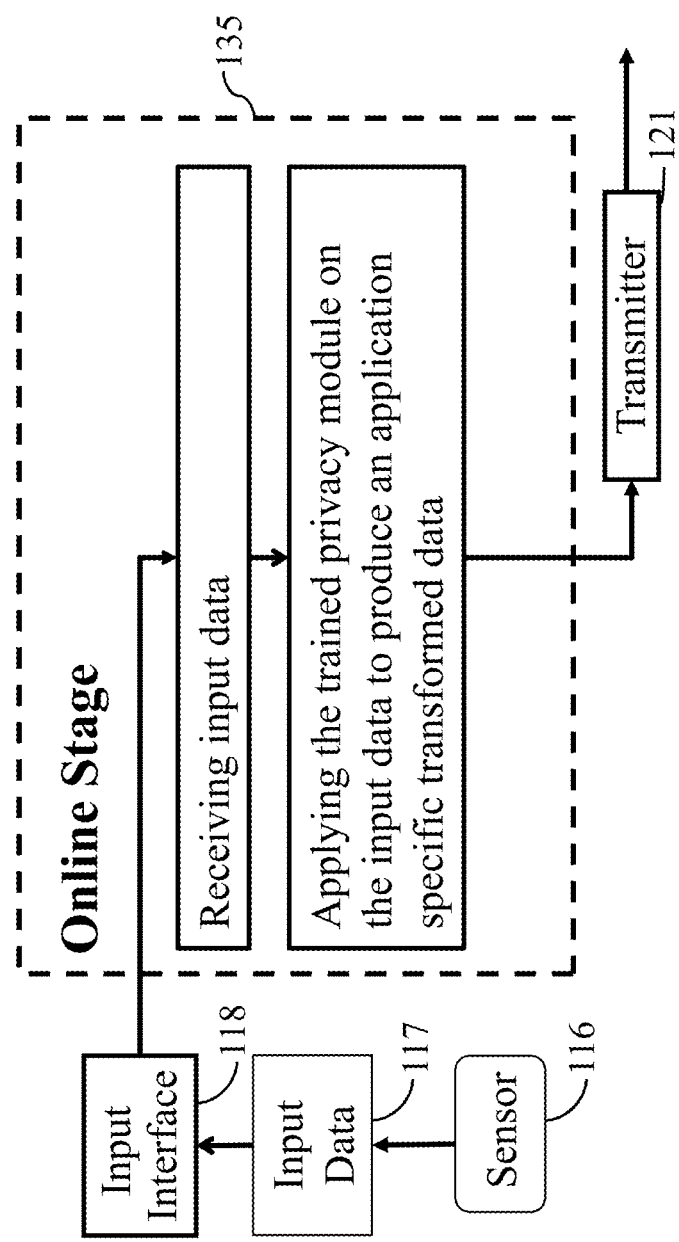
FIG. 1E is a block diagram illustrating the offline stage of FIG. 1C, according some embodiments of the present disclosure.

FIG. 1E is a block diagram illustrating the offline stage of FIG. 1C, according some embodiments of the present disclosure. The aspect of online state is to apply the trained privacy module on the input data to produce transformed data that can be released to another party to provide analytical utility while also preserving the privacy of sensitive information.

For example, regarding collected energy data from a client may include analytics for a benefit of the client and/or provider(s). A specific analytics objective of interest can be to determine the usage patterns of specific energy consuming device(s) (e.g., appliance(s) within a household), which may provide beneficial information to the client and/or provider, such as possibly aiding other services received by the client and/or performed by the provider (e.g., appliance operation information aiding a preventative maintenance/monitoring service, or providing marketing information). However, it may also be desirable to release an accurate representation of the energy consumption data to the provider(s) in order to enable later general analytics tasks not determined beforehand.

An example for speech data can include observed data that consists of voice measurements recorded by a microphone. The useful attributes associated with this observed data consists of the textual transcript of the words spoken, which could be useful for various voice-control or voice-input applications. The sensitive attributes could include, possibly depending on the user's preference, various personal characteristics that could be inferred from the audio of the voice recording, such as gender, age, ethnicity/accent, mood, location/other ambient surroundings, etc.

An example for factory automation could include observed data that includes various factory sensor measurements. Useful attributes could include machine operating conditions that could be inferred from analysis of the sensor measurements and hence useful for factory diagnostics/reporting applications. Sensitive attributes could include proprietary knowledge/process information that could also be inferred from the sensor measurements.

An example for medical data could include observed data that includes patient histories (symptoms, diagnoses, treatments, evaluations, outcomes, etc.), where useful attributes including statistical trends/analyses could be useful for medical research applications, and sensitive attributes could include any specific medical information that is directly linked to a particular patient.

Figure 2A:
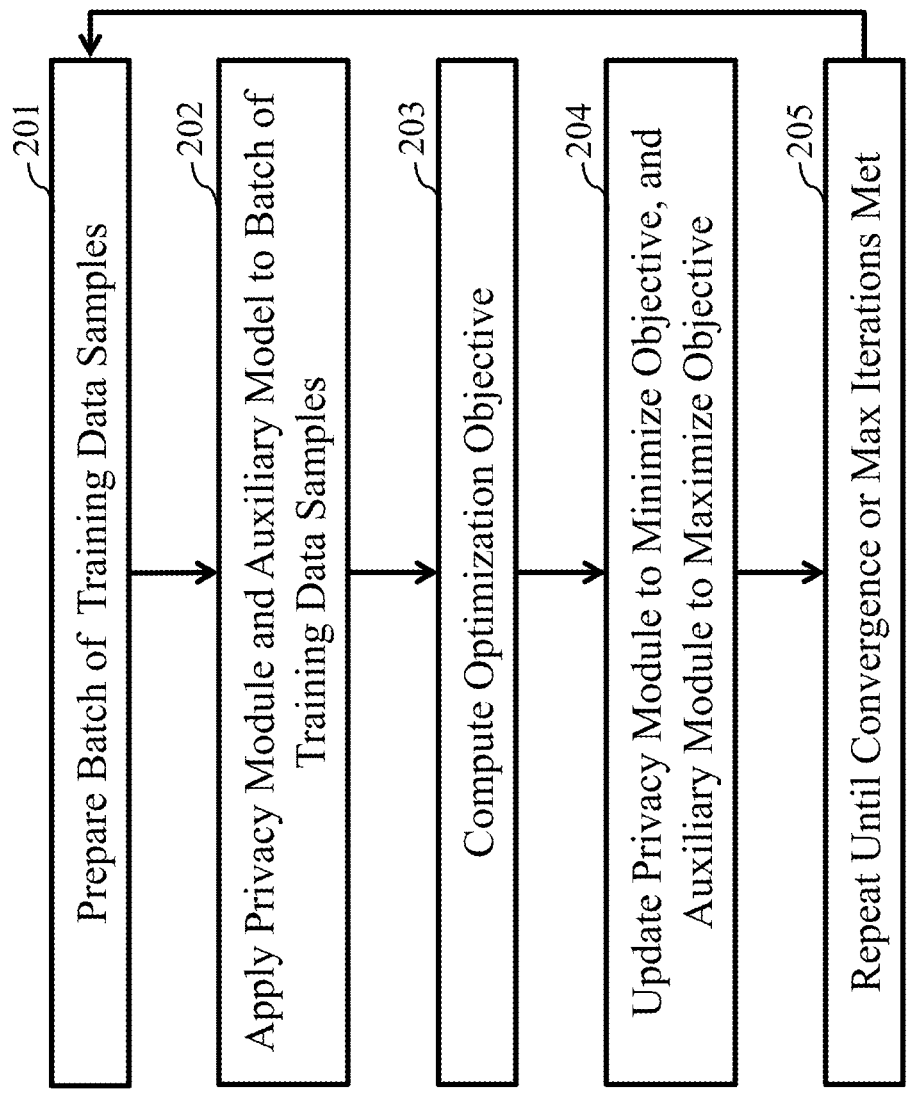
FIG. 2A is a block diagram illustrating the procedure to optimize the privacy module, according some embodiments of the present disclosure.

FIG. 2A is a block diagram illustrating the procedure to optimize the privacy module, according some embodiments of the present disclosure. The procedure begins with preparing a batch of training data samples 201. Then, the privacy module and auxiliary module are applied to the batch 202, which is followed by the computation the optimization objective 203, and updating the privacy module to minimize the objective and the auxiliary module to maximize the objective 204. This procedure is repeated until convergence or a maximum number of iterations is reached 205.

Figure 2B:
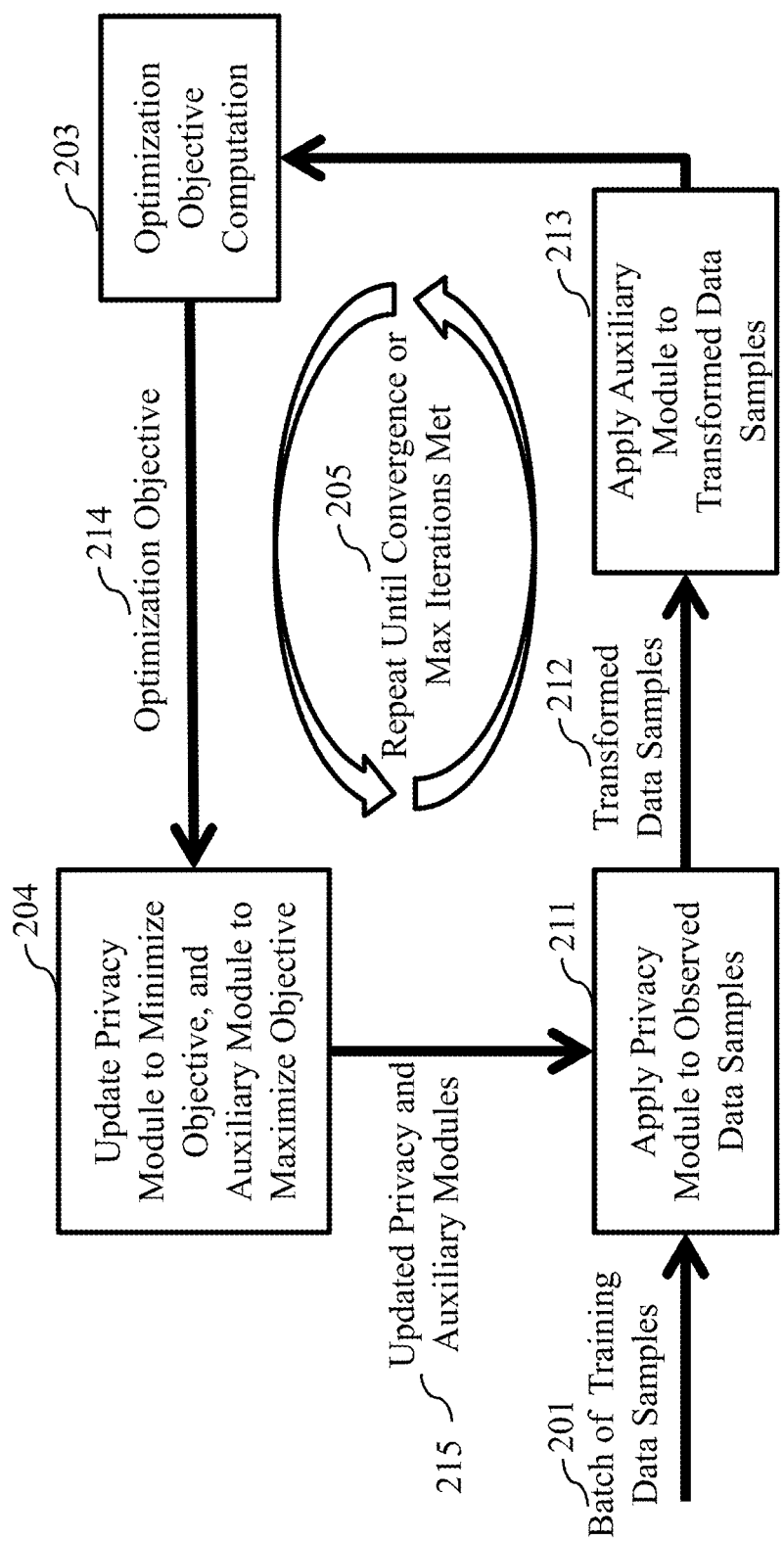
FIG. 2B is a block diagram illustrating further details in the procedure to optimize the privacy module, according some embodiments of the present disclosure.

FIG. 2B is a block diagram illustrating further details in the procedure to optimize the privacy module, according some embodiments of the present disclosure. The procedure begins with preparing a batch of training data samples 201. The privacy module is applied to the observed data samples 211 to produce the transformed data samples 212. The auxiliary module is applied 213 to the transformed data samples 212. Then, the optimization objective 214 is computed 203, followed by updating the privacy module to minimize the objective and the auxiliary module to maximize the objective 204. This procedure is repeated until convergence or a maximum number of iterations is reached 205.

Figure 3A:
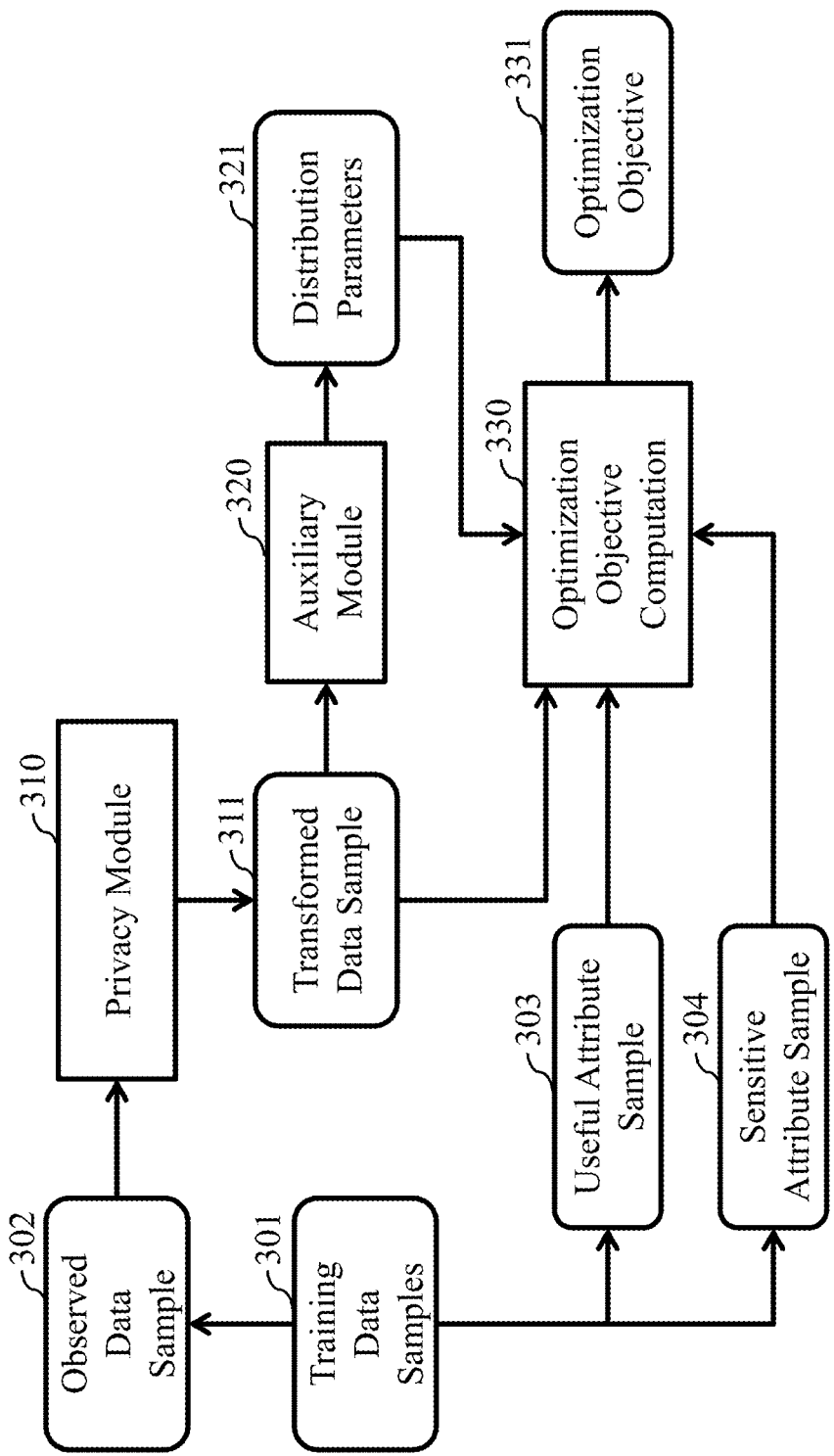
FIG. 3A is a block diagram illustrating the procedure for applying the privacy and auxiliary modules to a set of training samples and computing the optimization objective, according some embodiments of the present disclosure.

FIG. 3A is a block diagram illustrating the procedure for applying the privacy and auxiliary modules to a set of training samples and computing the optimization objective, according some embodiments of the present disclosure. In particular, the procedure for applying the privacy module 310 and auxiliary module 320 to a set of training samples 301 and performing the optimization objective computation 330 to yield the optimization objective 331. Each set of training data samples 301 consist an observed data sample 302, a useful attribute sample 303, and a sensitive attribute sample 304. The privacy module 310 is applied to the observed data sample 302 to produce a transformed data sample 311, on which the auxiliary module 320 is applied to produce the sensitive sample distribution parameters 321. The optimization objective is computed 330 from the useful attribute sample 303, sensitive attribute sample 304, transformed data sample 311, and the sensitive sample distribution parameters 321.

Figure 3B:
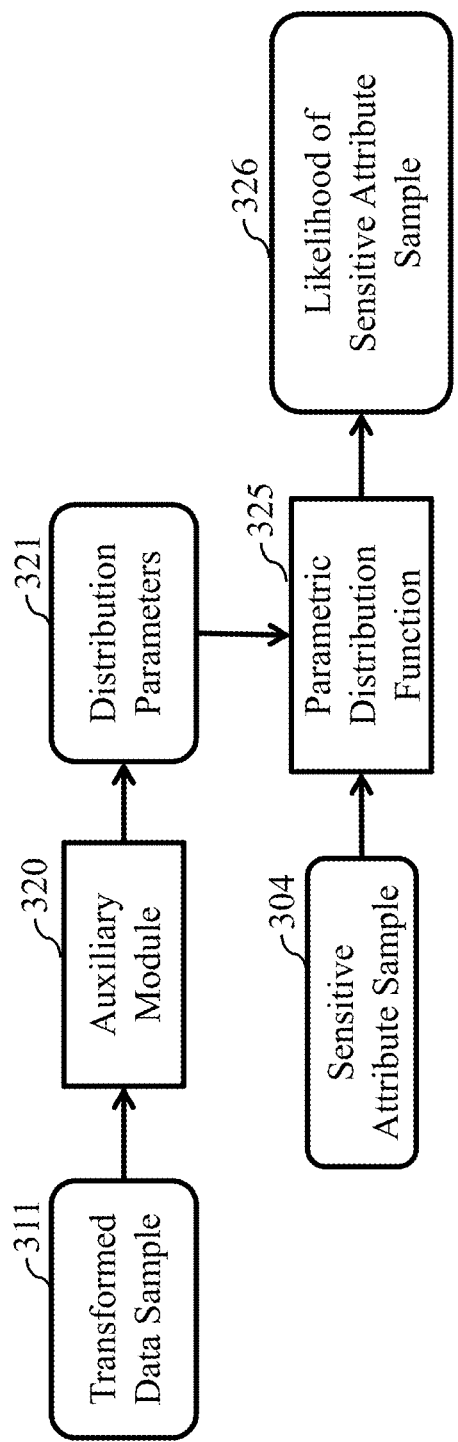
FIG. 3B is a block diagram illustrating the detailed procedure for applying the auxiliary module to produce the sensitive data likelihoods, as part of the computation of the objective function, according some embodiments of the present disclosure.

FIG. 3B is a block diagram illustrating the detailed procedure for applying the auxiliary module to produce the sensitive data likelihoods, as part of the computation of the objective function, according some embodiments of the present disclosure. In particular, the procedure for applying the auxiliary module 320 to produce the sensitive attribute sample likelihoods 326, as part of the computation of the objective function. The auxiliary module 320 is applied to a transformed data sample 311 to produce distribution parameters 321. The distribution parameters 321 are used along with the sensitive attribute sample 304 in the parametric distribution function 325 to compute the likelihoods of the sensitive attribute sample 326.

Figure 4:
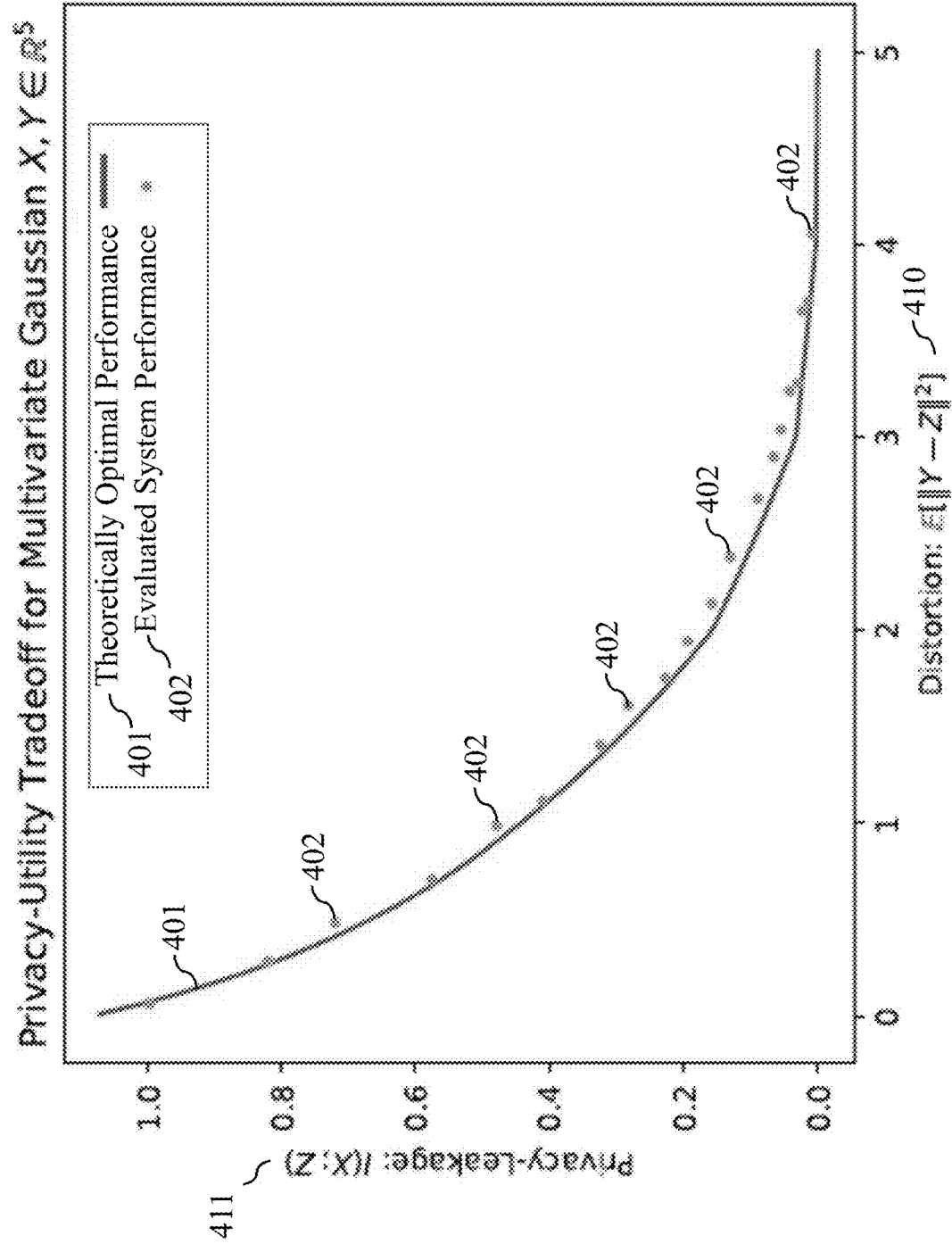
FIG. 4 is a graph illustrating example results showing that the described system achieves close to theoretically optimal performance, in an example involving multivariate, continuous data drawn from a Gaussian distribution, according some embodiments of the present disclosure.

FIG. 4 is a graph illustrating example results showing that the described system achieves close to theoretically optimal performance, in an example involving multivariate, continuous data drawn from a Gaussian distribution, according some embodiments of the present disclosure. The graph of FIG. 4 depicts the theoretically optimal performance 401 that is analytically derived given knowledge of the data distribution versus the evaluated performance 402 of the described system, which does not use knowledge of the distribution. The x-axis is the expected mean-squared-error distortion 410, and the y-axis is the estimated privacy leakage quantified by the mutual information of the sensitive attributes in the transformed data 411.

Figure 5:
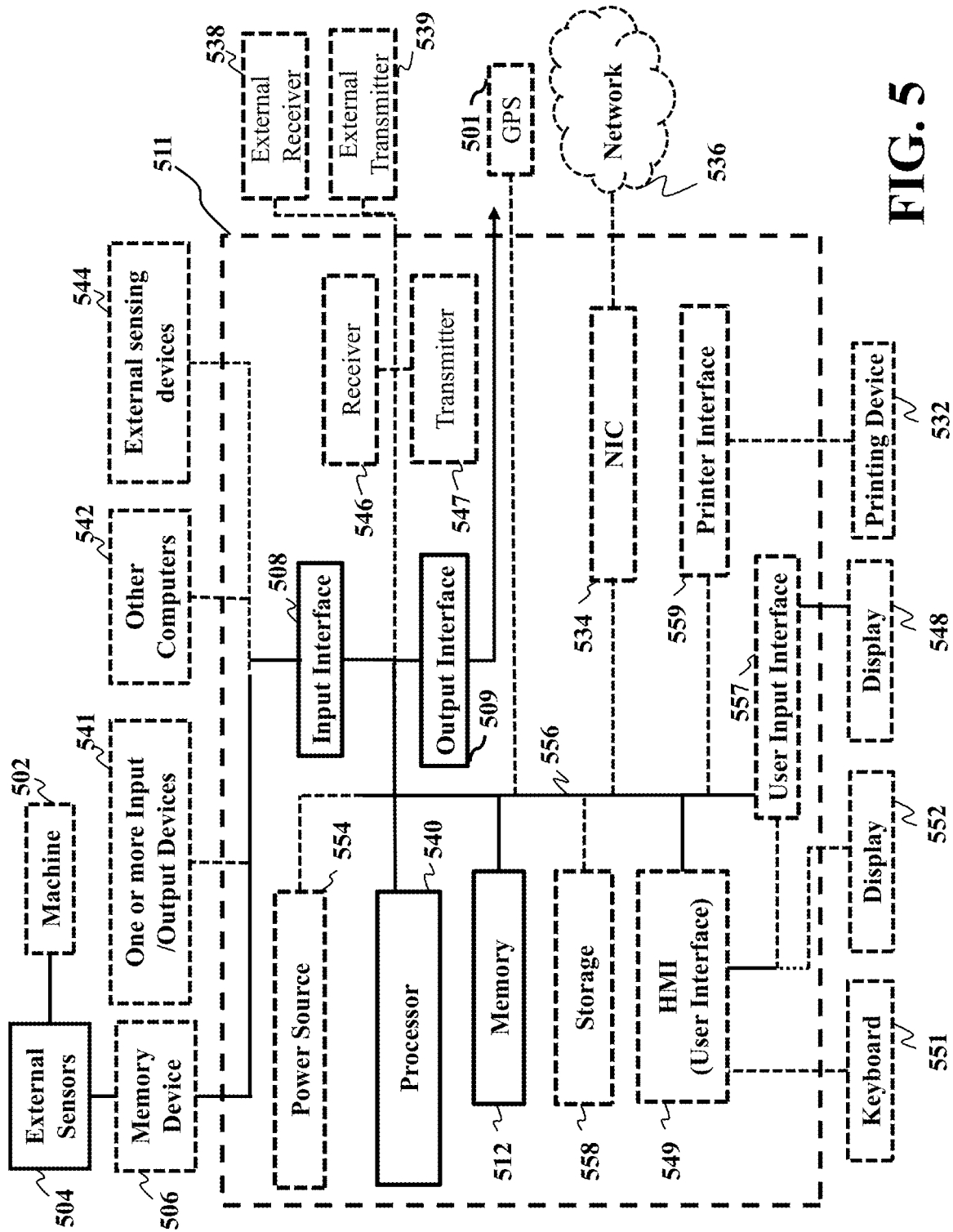
FIG. 5 is a block diagram illustrating the method of FIG. 1A, that can be implemented using an alternate computer or processor, according to embodiments of the present disclosure.

FIG. 5 is a block diagram illustrating the methods of FIG. 1A and FIG. 1B, that can be implemented using an alternate computer or processor, according to embodiments of the present disclosure.

FIG. 5 is a block diagram of illustrating the method of FIG. 1A, that can be implemented using an alternate computer or processor, according to embodiments of the present disclosure. The computer 511 includes a processor 540, computer readable memory 512, storage 558 and user interface 549 with display 552 and keyboard 551, which are connected through bus 556. For example, the user interface 564 in communication with the processor 540 and the computer readable memory 512, acquires and stores the signal data examples in the computer readable memory 512 upon receiving an input from a surface, keyboard surface 564, of the user interface 564 by a user.

The computer 511 can include a power source 554, depending upon the application the power source 554 may be optionally located outside of the computer 511. Linked through bus 556 can be a user input interface 557 adapted to connect to a display device 548, wherein the display device 548 can include a computer monitor, camera, television, projector, or mobile device, among others. A printer interface 559 can also be connected through bus 556 and adapted to connect to a printing device 532, wherein the printing device 532 can include a liquid inkjet printer, solid ink printer, large-scale commercial printer, thermal printer, UV printer, or dye-sublimation printer, among others. A network interface controller (NIC) 534 is adapted to connect through the bus 556 to a network 536, wherein time series data or other data, among other things, can be rendered on a third party display device, third party imaging device, and/or third party printing device outside of the computer 511. The computer 511 can include a global positioning system (GPS) 501. Further, external sensors 504 can be coupled to a machine(s) 502 and to an external memory 506. An input/output device(s) 541, other computers 542 and external sensing devices 544 can be coupled to the computer 511.

Still referring to FIG. 5, the signal data or other data, among other things, can be transmitted over a communication channel of the network 536, and/or stored within the storage system 558 for storage and/or further processing. Contemplated is that the signal data could be initially stored in an external memory and later acquired by the processor to be processed or store the signal data in the processor's memory to be processed at some later time. The processor memory includes stored executable programs executable by the processor or a computer for performing the systems/methods.

Further, the signal data or other data may be received wirelessly or hard wired from a receiver 546 (or external receiver 538) or transmitted via a transmitter 547 (or external transmitter 539) wirelessly or hard wired, the receiver 546 and transmitter 547 are both connected through the bus 556. The computer 511 may be connected via an input interface 508 to external sensing devices 544 and external input/output devices 541. For example, the external sensing devices 544 may include sensors gathering data before-during-after of the collected signal data of the elevator/conveying machine. For instance, environmental conditions, i.e. temperature, The computer 511 may be connected to other external computers 542. An output interface 509 may be used to output the processed data from the processor 540. It is noted that a user interface 549 in communication with the processor 540 and the non-transitory computer readable storage medium 512, acquires and stores the region data in the non-transitory computer readable storage medium 512 upon receiving an input from a surface 552 of the user interface 549 by a user.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A communication system, the system comprising:
a receiver to receive training data from at least one sensor, wherein the training data includes samples of data including predetermined sensitive attributes, useful attributes and observable data;
an input interface to receive input data;
a hardware processor coupled to the receiver and a memory, is capable of executing a privacy module, an auxiliary module, a plurality of functions and the training data stored in the memory, the hardware processor is configured to
initialize the privacy module using the training data, wherein the privacy module is configured to transform the training data into transformed data by determining parameters of a parametric probability distribution;
generate a trained privacy module, by iteratively optimizing an objective function, wherein for each iteration the objective function is computed by a combination of a distortion of the useful attributes in the transformed data and of a mutual information between the sensitive attributes and the transformed data, such that the distortion is estimated by an empirical average with respect to a user, a user specified distortion function, or both, to inversely capture a utility of the transformed data toward conveying information about the useful attributes, wherein the mutual information is estimated by the auxiliary module by maximizing a conditional likelihood of the sensitive attributes given the transformed data, so that the mutual information estimate inversely captures a privacy of the sensitive attributes with respect to the transformed data, and wherein the iteratively optimized trained privacy module indirectly minimizes the conditional likelihood through the mutual information estimate that is part of computing the objective function;
receive the input data via the input interface in communication with the hardware processor;
apply the trained privacy module on the input data to produce an application specific transformed data; and
a transmitter to transmit the application specific transformed data over a communication channel.

2. The communication system of claim 1, wherein the privacy module transforms the training data into transformed data, the transformed data is produced by randomly sampling according to the parametric probability distribution.

3. The communication system of claim 1, wherein the training data includes time series data, speech data, smart home data, factory automation data, medical data.

4. The communication system of claim 1, wherein the privacy module determines the parameters of the parametric probability distribution by applying a neural network to the observed data, such that the output of the neural network are parameters.

5. The communication system of claim 1, wherein the stored privacy module is pre-trained with historical training data having predetermined sensitive attributes, useful attributes and observable data.

6. The communication system of claim 1, wherein the distortion of the useful attributes in the transformed data is determined by the empirical average of the user specified distortion function, over a batch of training data and corresponding transformed data produced by applying the privacy mechanism to the observable data.

7. The communication system of claim 1, wherein the auxiliary module is optimized by a gradient descent algorithm to maximize the conditional log likelihood of the sensitive attributes given the transformed data, such that the mutual information estimation and maximizing the conditional likelihood is part of the auxiliary module.

8. The communication system of claim 7, wherein the mutual information between the sensitive attributes and the transformed data is estimated by an empirical average of a log of conditional likelihoods of the sensitive data over a batch of training data, such that the log of conditional likelihoods of the sensitive data is from the auxiliary module.

9. The communication system of claim 1, wherein the privacy module and auxiliary module are realized as parametric functions including neural networks, such that a gradient of the objective function is computed with respect to the parameters of the privacy module and the auxiliary module, and that the privacy module and the auxiliary module are optimized via gradient descent algorithms.

10. The communication system of claim 1, wherein the privacy module further comprises an additional input that is random seed noise, such that the privacy module produces transformed data as a randomized function of the observed data.

11. The communication system of claim 1, wherein the iterations continue until a termination condition is met, to obtain the trained privacy module.

12. The communication system of claim 1, wherein the objective function includes $$\frac{1}{m}\sum_{i=1}^{m} \log Q(x_i \mid z_i) + \lambda d(y_i, z_i),$$

wherein m is the number of training samples, i indexes the training samples, $x_i$ is a sample of sensitive attributes, $y_i$ is a sample of useful attributes, $z_i$ is a sample of transformed data, $Q(x_i|z_i)$ is the conditional likelihood of a sample of sensitive attributes $x_i$ given the sample of transformed data $z_i$, $\lambda$ is a balance parameter controlling a privacy-utility tradeoff, and $d(y_i, z_i)$ is the distortion of the sample of useful attributes $y_i$ in the sample of transformed data $z_i$.

13. The communication system of claim 12, further comprising:
an input interface to accept a value of a balance parameter $\lambda$ controlling a privacy-utility tradeoff.

14. The communication system of claim 1, wherein the objective function includes $$\frac{1}{m}\sum_{i=1}^{m} \log Q(x_i|z_i) + \lambda(\max(d(y_i, z_i) - \delta, 0))^2,$$

wherein m is the number of training samples, i indexes the training samples, $x_i$ is a sample of sensitive attributes, $y_i$ is a sample of useful attributes, $z_i$ is a sample of transformed data, $Q(x_i|z_i)$ is the conditional likelihood of a sample of sensitive attributes $x_i$ given the sample of transformed data $z_i$, $\delta$ is the distortion threshold, $\lambda$ is a penalty parameter controlling the penalization for exceeding the distortion threshold, and $d(y_i, z_i)$ is the distortion of the sample of useful attributes $y_i$ in the sampled of transformed data $z_i$.

15. The communication system of claim 14, further comprising:
an input interface to accept a value of a distortion threshold $\delta$, such that the privacy mechanism is optimized to limit the distortion of the useful attributes in the transformed data to no larger than the value of the distortion threshold.

16. A communication system, the system comprising:
a receiver to receive training data from at least one sensor, wherein the training data includes samples of data including predetermined sensitive attributes, useful attributes and observable data;
an input interface to receive input data;
a hardware processor coupled to the receiver and a memory, is capable of executing a privacy module, an auxiliary module, a plurality of functions and the training data stored in the memory, and in an offline state, the hardware processor is configured to
initialize the privacy module using the training data, wherein the privacy module is configured to transform the training data into transformed data by determining parameters of a parametric probability distribution, such that the transformed data is produced by randomly sampling according to the parametric probability distribution;
generate a trained privacy module, by iteratively optimizing an objective function, wherein for each iteration the objective function is computed by a combination of a distortion of the useful attributes in the transformed data and of a mutual information between the sensitive attributes and the transformed data, such that the distortion is estimated by an empirical average with respect to a user, a user specified distortion function, or both, to inversely capture a utility of the transformed data toward conveying information about the useful attributes, wherein the mutual information is estimated by the auxiliary module by maximizing a conditional likelihood of the sensitive attributes given the transformed data, so that the mutual information estimate inversely captures a privacy of the sensitive attributes with respect to the transformed data, and wherein the iteratively optimized trained privacy module indirectly minimizes the conditional likelihood through the mutual information estimate that is part of computing the objective function, and wherein the iterations continue until a termination condition is met, to obtain the trained privacy module;
receive the input data via the input interface in communication with the hardware processor in an online state;
apply the trained privacy module on the input data to produce an application specific transformed data; and
a transmitter to transmit the application specific transformed data over a communication channel.

17. The system of claim 16, wherein the sensitive attributes and useful attributes are related according to an unknown joint probability distribution.

18. The system of claim 16, wherein the observed data is governed by an unknown conditional distribution given values of the sensitive attributes and values of the useful attributes.

19. The system of claim 16, wherein the privacy module and the auxiliary module are alternatingly updated over the iterative optimization of a gradient descent algorithm.

20. A method for applying a privacy module to transform data, such that a privacy of the transformed data is protected, while analytical usefulness of the transformed data is preserved, the method comprising:
receiving training data via a receiver from at least one sensor, wherein the training data includes training data samples including predetermined sensitive attributes, useful attributes and observable data;
storing a privacy module, an auxiliary module a plurality of functions and the training data in a memory, wherein the privacy module is configured to transform the training data into transformed data by determining parameters of a parametric probability distribution, such that the transformed data is produced by randomly sampling according to the parametric probability distribution, wherein the memory is in communication with the receiver;
using a hardware processor coupled to the receiver and the memory, capable of executing the stored privacy module and the stored plurality of functions, and is configured for
initializing the stored privacy module using the training data, wherein the privacy module is configured to transform the training data into transformed data by determining parameters of a parametric probability distribution, such that the transformed data is produced by randomly sampling according to the parametric probability distribution;
generating a trained privacy module, by iteratively optimizing an objective function, wherein for each iteration the objective function is computed by a combination of a distortion of the useful attributes in the transformed data and of a mutual information between the sensitive attributes and the transformed data, such that the distortion is estimated by an empirical average with respect to a user, a user specified distortion function, or both, to inversely capture a utility of the transformed data toward conveying information about the useful attributes, wherein the mutual information is estimated by the auxiliary module by maximizing a conditional likelihood of the sensitive attributes given the transformed data, so that the mutual information estimate inversely captures a privacy of the sensitive attributes with respect to the transformed data, and wherein the iteratively optimized trained privacy module indirectly minimizes the conditional likelihood through the mutual information estimate that is part of computing the objective function, and wherein the iterations continue until a termination condition is met, to obtain the trained privacy module;

receiving input data via an input interface in communication with the hardware processor in an online state;

applying the trained privacy module on the input data to produce an application specific transformed data; and transmitting via a transmitter the application specific transformed data over a communication channel.

21. The method of claim 20, wherein the optimization of the privacy module and the auxiliary module is performed using training steps of:

acquiring from the training data, training data samples including corresponding tuples of a sample of the sensitive attributes, a sample of the useful attributes, and a sample of the observable data;

processing the samples of the observable data with the privacy module to produce samples of the transformed data;

processing the samples of transformed data with the auxiliary module to produce conditional likelihoods of the samples of the sensitive attributes given the samples of the transformed data;

calculating the objective function using values of the samples of sensitive attributes, the samples of useful attributes, the samples of transformed data, and the likelihoods of the samples of sensitive attributes given the samples of the transformed data;

updating the privacy module to reduce the objective function;

updating the auxiliary module to increase the likelihood of the samples of sensitive attributes given the samples of the transformed data; and repeating the training steps until a termination condition is met.

* * * * *